United States Patent [19]

Block

[11] 4,431,550

[45] Feb. 14, 1984

[54] DRILLING FLUID VISCOSIFIER

[75] Inventor: Jacob Block, Rockville, Md.

[73] Assignee: W. R. Grace & Co., New York, N.Y.

[21] Appl. No.: 370,979

[22] Filed: Apr. 22, 1982

[51] Int. Cl.$^3$ .......................... C09K 7/02; B01J 13/00
[52] U.S. Cl. ............................... 252/8.5 A; 252/8.5 B; 252/315.7
[58] Field of Search .............. 252/8.5 A, 8.5 B, 315.7; 423/626, 629

[56] References Cited

U.S. PATENT DOCUMENTS

| | | | |
|---|---|---|---|
| 2,345,134 | 3/1944 | Lindsay et al. | 252/8.5 B |
| 3,656,889 | 4/1972 | Olewinski | 252/8.5 B |
| 4,157,382 | 6/1979 | Goodboy et al. | 252/315.7 |
| 4,240,915 | 12/1980 | Block | 252/8.5 B |
| 4,240,924 | 12/1980 | Block | 252/8.5 B |
| 4,366,070 | 12/1982 | Block | 252/8.5 A |

FOREIGN PATENT DOCUMENTS

| | | | |
|---|---|---|---|
| 930522 | 7/1973 | Canada | 252/8.5 B |
| 827392 | 2/1960 | United Kingdom | 252/8.5 B |
| 709662 | 1/1980 | U.S.S.R. | 252/8.5 A |

*Primary Examiner*—Christine M. Nucker
*Attorney, Agent, or Firm*—Edward J. Cabic

[57] ABSTRACT

An aqueous aluminum hydroxide is produced by reacting an acid and a base reactant, where at least one reactant has aluminum, in the presence of a hydroxy acid or a salt of this hydroxy acid. The resulting product has unwanted tri-hydrate formation inhibited as well as a reduced amount of boehmite crystallization. The product can be used as a viscosifier in aqueous drilling fluids.

32 Claims, No Drawings

DRILLING FLUID VISCOSIFIER

BACKGROUND OF THE INVENTION

1. Field of the Invention

This invention relates to novel inhibited aluminum hydroxide viscosifier compositions containing pseudoboehmite which have been treated to inhibit tri-hydrate formation and to retard boehmite crystallization as well as to a method of producing these novel compositions.

2. Description of the Previously Published Art

Water-based, clay-free drilling fluids for use in drilling bore holes into subterranean formations are disclosed in U.S. Pat. No. 4,240,915 to J. Block containing water and an aluminum hydroxide agent. A conventional method to make this aluminum hydroxide agent is to react an alkali metal aluminate ($Na_2O \cdot Al_2O_3 \cdot 3H_2O$) with an acid such as hydrochloric acid (HCl) under high speed agitation to obtain AlO(OH) in the pseudoboehmite form. However, when AlO(OH) is prepared under these conditions the products will eventually convert to the undesirable thermodynamically stable tri-hydrate such as bayerite and gibbsite. One way to slow down this conversion to the tri-hydrates is to add high concentrations of salts such as sodium chloride. However, this addition dilutes the product with excess salt and it provides for a corrosive mixture when used with drilling equipment.

3. Objects of the Invention

It is an object of this invention to provide an improved aluminum hydroxide containing viscosifier.

It is a further object of this invention to obtain an aluminum hydroxide viscosifier composition which inhibits undesirable tri-hydrate formation such as gibbsite and/or bayerite and which inhibits boehmite crystallization so as to maintain desirable rheological properties.

It is a further object to produce an inhibited aluminum hydroxide viscosifier which is essentially tri-hydrate free by adding an inhibiting material directly to the reactants used in making the aluminum hydroxide viscosifier.

These and further objects will become apparent as the description of the invention proceeds.

SUMMARY OF THE INVENTION

Aqueous aluminum hydroxide viscosifier compositions, which are made by reacting an acid reactant and a base reactant wherein at least either the acid or the base contains aluminum, can be produced so as to inhibit tri-hydrate formation and so as to retard boehmite crystallization. This result is achieved by conducting the aluminum hydroxide forming reaction in the presence of hydroxy acids or their salts. Examples of suitable hydroxy acids are gluconic, tartaric, gallic, citric, etc. or mixtures thereof. Examples of suitable salts for the acids are alkali metal salts such as sodium and potassium and ammonium salts.

The material produced by the present invention is referred to as an inhibited aluminum hydroxide. The term "inhibited aluminum hydroxide" when used herein refers to the above-described reaction product which contains aluminum hydroxide in the pseudoboehmite form, in the boehmite form, in the amorphous form or any mixture of these forms and which does not contain any substantial amount of aluminum tri-hydrates.

The amount of the hydroxy acid or hydroxy acid salt inhibitor added is a relatively small amount on the order of about 0.5–5% by weight based on the weight of the aluminum present expressed as AlO(OH). The inhibitor is added either to the reactant acid solution or the reactant basic solution or both before the acid and base are mixed to form the inhibited aluminum hydroxide where at least one of the acid or base contains aluminum. Examples of the suitable acids are hydrochloric acid, nitric acid, sulfuric acid, aluminum chloride, aluminum nitrate, aluminum sulfate, etc. either alone or in mixtures. Examples of the suitable bases are sodium hydroxide, potassium hydroxide, ammonium hydroxide, sodium aluminate, potassium aluminate, etc. either alone or in mixtures. It is believed that ammonium aluminate would also be operable if available. The pH of the reaction mixture is maintained from about 7 to about 11 with a more preferred range from about 8 to about 10.

The aqueous composition can be partially dried to obtain a dried, inhibited product. A satisfactory solid material is obtained when the mixture is dried to a level where the aluminum present expressed as AlO(OH) is about at least 10% by weight.

DESCRIPTION OF THE PREFERRED EMBODIMENTS

The inhibited aluminum hydroxide viscosifier compositions according to the present invention are an improvement over the viscosifiers in the water-based, clay-free drilling fluids disclosed in U.S. Pat. No. 4,240,915 to J. Block and the disclosure of this patent is incorporated herein by reference. Those drilling fluids contain water and an aluminum hydroxide agent and are made by reacting an acid reactant and a basic reactant where at least one has an aluminum source present. The improvement according to the present invention is to also have present, while the acid and base react to form the aluminum hydroxide, a hydroxy acid or a salt of a hydroxy acid to inhibit tri-hydrate formation and to retard boehmite crystallization. The resulting inhibited aluminum hydroxide viscosifier composition can be used in water-based, clay-free drilling fluids.

The inhibited aluminum hydroxide found useful is substantially water-insoluble, that is, a material which is in suspension or dispersion in aqueous systems which has a pH of at least about 8. Further, the inhibited aluminum hydroxide possess a definite characterizing x-ray diffraction spectrum having a major characterizing diffraction peak at 6.3±0.2 Angstrom units or it is characterized by an x-ray diffraction spectrum as being amorphous, that is, having substantially no x-ray diffraction pattern within the range of from 1.5 to 17 Angstrom units. The spectra are determined by standard techniques using the K-alpha doublet of copper as the radition source.

The aqueous suspensions or dispersions of the inhibited aluminum hydroxide having the above-described x-ray characterization are capable of imparting non-Newtonian, pseudoplastic properties to the aqueous system. The inhibited aluminum hydroxide agent can be formed from known reactants under substantially basic conditions. The material has hydroxyl groups as an integral part of the its composition including bound water of hydration.

It has been found that due to the amphoteric nature of aluminum, the inhibited aluminum hydroxide of the present invention can be formed by contacting an aqueous solution or suspension of an acidic or basic precursor material with a neutralizing agent while one of the components contains the inhibitor material. The basic precursor material can be an alkali metal aluminate such as a sodium aluminate or a potassium aluminate. It is believed that ammonium aluminate would also be operable if available. This is contacted with a sufficient amount of an acidic agent such as inorganic mineral acid, as for example sulfuric, hydrochloric, nitric and the like, and preferably hydrochloric, or a salt of a strong acid and a weak base to cause the pH of the solution to be reduced to within the ranges described hereinbelow and to thereby convert the aluminate to the inhibited aluminum hydroxide of the present invention. The acid can be used in slight excess and then back titrated with a base to the desired pH to assure conversion of the precursor to the hydroxide. The aluminate precursor can be any commercially available alkali metal aluminate or the aluminate can be obtained by conventional techniques such as by the action of a base on aluminum or aluminum oxide. The aluminate normally will have an alkali metal oxide to aluminum oxide mole ratio of from about 1:1 to 4:1.

Suitable acidic precursor materials for forming the aluminum hydroxide agent are water-soluble, acidic aluminum salts such as aluminum halides, preferably aluminum chloride, as well as aluminum sulfate, aluminum nitrate and the like. Aqueous solutions of these precursor materials can be contacted with a sufficient amount of water-soluble base, such as an alkali metal hydroxide as, for example, sodium hydroxide, potassium hydroxide and the like or ammonium hydroxide to cause the resultant aqueous system to have a pH within the range described hereinbelow and to thereby form the desired inhibited aluminum hydroxide.

The desired inhibited aluminum hydroxide can also be formed from an acidic aluminum precursor material such as a water-soluble acidic aluminum salt as described hereinabove with a basic aluminate as described hereinabove by contacting the precursor materials in an aqueous system in suitable ratios to cause the resultant system to have a pH within the range described hereinbelow where again at least one of the components contains the inhibitor materials.

The inhibited aluminum hydroxide should be formed in an aqueous system which has a pH above about 7 to about 11 and preferably a pH of from about 8 to about 10. A drilling fluid formed with such aqueous systems should have a pH within the range of about 8 to about 10.3 and preferably between about 9 to 10 to exhibit the desired properties of viscosity and non-Newtonian pseudoplasticity.

The inhibited aluminum hydroxide can be formed in an aqueous system. The acidic or basic precursor material can be present in concentrations of from about 5 to 50 percent by weight based on the water present. The concentration can vary outside of this range, but should not be such as to inhibit the thorough mixing, preferably under high speed agitation, of the reactants during the formation of the inhibited aluminum hydroxide viscosifying agent. Further, it has been found that the rheological properties of the resultant water-based fluid are further enhanced by initially subjecting the aqueous system containing the inhibited aluminum hydroxide to mixing at high shear rates of about 20,000 sec$^{-1}$ or greater for short periods of time as from 5 to 60 minutes such as by circulating the aqueous system through a small orifice I.D. tube at a high rate prior to utilization as a drilling fluid.

Among the hydroxy acids that can be employed as the inhibitor according to the present invention either alone or in mixture are glycolic, lactic, alpha-hydroxybutyric, mandelic, glyceric, malic, tartaric, glycolic, mesotartaric, citric, gluconic, and gallic acids. Especially preferred are the acids gluconic, tartaric, gallic, citric, or mixtures thereof. In addition to the free acid form, the hydroxy acid can be supplied in the salt form. Examples of the salt forms are the sodium, potassium and ammonium salt forms as well as mixtures of these salt forms.

Especially preferred are a combination of acids such as tartaric and gluconic acid. The amount of the acid is generally quite small, from about up to 5% by weight based on the weight of the aluminum present when expressed as AlO(OH).

The aqueous system in which the inhibited aluminum hydroxide is formed can be directly used to form the water-based drilling fluids of the subject invention by diluting the aqueous system with a sufficient amount of water to form a system having an effective amount of the inhibited aluminum hydroxide agent therein to impart the desired rheological properties. Normally, AlO(OH) concentrations of from about 0.5 to 5 percent, and preferably from 2 to 3 percent, by weight based on the weight of the water have been found to impart the desired properties. The concentration most suitable can be readily determined in conventional manners by the mud engineer taking into consideration the concentration and nature of other materials which may also be contained in the drilling fluid. The pH of the water-based drilling fluid should be maintained within the ranges described above.

The aqueous system in which the inhibited aluminum hydroxide is formed can also be dried to reduce the water content and to produce a powder. Conventional slurry drying techniques can be used to dry the aqueous system to a solid form where the aluminum content expressed as AlO(OH) is about at least 10% by weight.

The above-described inhibited aluminum hydroxide is capable of causing a clay-free, (the term "clay-free" when used herein refers to the absence of drilling fluid viscosifying clays as an essential agent of the fluid and not to other materials entrained therein) water-based drilling fluid (the term "fluid" or "system" when used herein refers to water containing the inhibited aluminum hydroxide of the subject invention in solution, suspension or dispersion) to have suitable rheological properties of viscosity and non-Newtonian, pseudoplasticity, that it to say, that the viscosity of the resultant water-based drilling fluid varies inversely with respect to the shear rate exerted on the fluid. The relationship of the shear stress with respect to shear rate can be defined by the rheological power law model relationship of $\tau = K(\gamma)^n$ in which $\tau$ represents the shear stress exerted on the aqueous system of the drilling fluid in units such as pounds per 100 ft$^2$ or dynes/cm$^2$; $\gamma$ is the shear rate in units of reciprocal time such as sec$^{-1}$; K is a constant having the value of the shear stress of the particular system at a shear rate of 1 sec$^{-1}$; and n is a numerical value of greater than zero. It has been found that water-based drilling fluids containing the presently described inhibited aluminum hydroxide viscosifying agent exhibit shear stress ($\tau$) properties at varying shear rates ($\gamma$) in the range of from about 10 to 400 sec$^{-1}$, that is, in the range normally encountered in the annular region of the bore hole, such that n of the power law relationship has a value of less than about 0.4. Such systems, therefore, exhibit non-Newtonian, pseudoplastic properties to an exceptionally high and desirable degree.

When plotting log shear stress on the ordinate versus log shear rate on the abscissa of a graph, the slopes and intercepts provide useful information. At low shear rates, such as from about 10 to about 400 sec$^{-1}$, as are encountered in the annular region of the bore hole, the shear stress should increase at a low rate with respect to the shear rate exerted on the material which is observed as a low slope (or n value according to the power law relationship) of the curve. The lower the slope of n value within this region the more desirable the fluid. In certain instances the slope may continuously or segmentally change, but it should retain an n value of about 0.4 or less. At high shear rates, such as above 20,000 sec$^{-1}$ as are found in the region of a drill bit in a drilling operation, the fluid should have a low viscosity, that is, approach the viscosity of water since this permits high drilling rates. At such viscosities the fluid approaches a Newtonian liquid and there is an increased slope of the curve with n having a value approaching or equal to unity. The value for K in the power law relationship is the shear stress value determined or extrapolated for a shear rate of 1 sec$^{-1}$ and is a direct measure of the viscosity of the aqueous system at 1 sec$^{-1}$.

The inhibited aluminum hydroxide can contain some amount of boehmite. However, it is preferred that the crystals are of a small size. If the boehmite crystals grow to be too large, then the aluminum hydroxide viscosifier composition loses its good rheological properties such that is becomes Newtonian and no longer shear rate thinning.

In addition to presently finding that the inhibited aluminum hydroxide imparts desired viscosity and pseudoplasticity to water-based drilling fluids it has been further found that this material has excellent stability to temperature, calcium and sodium salts and various other conditions desired of a fluid used in rotary drilling of bore holes and the like. The drilling fluids containing the subject inhibited aluminum hydroxide have been found to have high degrees of stability with respect to their rheological properties under various adverse conditions. Such fluids have been found to be stable after subjection to elevated temperatures for sustained periods of time, to high shear rates such as are encountered at the site of the drill bit, as well as being stable in the presence of various corrosive elements such as calcium chloride, and sodium chloride which may be entrained in such fluids.

The roller oven test used in the examples has the material in a rotating chamber in an oven at a temperature of 250° F. (121° C.) to simulate the conditions down in a well near the drill bit where shear forces exist in addition to the elevated temperatures. The present inhibited aluminum hydroxide is able to withstand this condition much better and with a smaller sized boehmite crystal formed than does an aluminum hydroxide material that was made without any inhibitor present.

The high degree and breadth of stability of the presently achieved drilling fluid, when combined with its ability to exhibit non-Newtonian, pseudoplastic properties under varying low shear rates of from about 10 to 400 sec$^{-1}$ and greater, such as are encountered in the annular region between the drill stem and the casing of the bore hole, aids in increasing the drilling efficiency, that is, the rate of drilling the bore hole. Drilling fluids having concentrations of from about 0.5 to about 5 percent, and preferably 2 to 3 percent, active solids (as AlO(OH) yield fluid systems which have the desired properties.

The drilling fluid composition can contain other conventional drilling fluid additives such as water loss inhibitors as, for example, polyanionic cellulose and the like or a cross-linked polyvinyl alcohol as described in United States Patent Application Ser. No. 239,079 filed Feb. 27, 1981, the disclosure of which is incorporated herein by reference. The cross-linked polyvinyl alcohol is formed as a reaction product between polyvinyl alcohol and a compound containing at least one aldehyde group therein or capable of generating in situ at least one aldehyde group. The drilling fluid composition can also contain weighting agents as, for example, crushed oyster shells, barite, and the like.

The term "water-based" which is used herein in describing the present invention, generally includes drilling fluids which have a liquid base comprising substantially fresh water or salt water. However, it is to be realized that at times certain small amounts of other liquids may be emulsified or admixed with the water-based fluid. For example, drilling fluids may at times contain small amounts of oil, emulsified or admixed with the drilling fluid, the oil coming either from an oil formation drilled into or, under certain conditions, can be purposely added.

The presently described drilling fluids have several distinct advantages over fluids using conventional viscosifying agents, such as clays, Xanthan gums or synthetic organic polymers. The presently described drilling fluids have been found to be stable to various salts commonly found in drilling fluid compositions, while the commonly used clays, such as bentonite or attapulgite, are normally sensitive to the presence of such salts and lose their ability to impart viscosity to the fluids. Such clays should, therefore, not be used as a viscosifier component of the subject drilling fluids. Xanthan gums are also used as the viscosifying agents in drilling fluids, but have the disadvantage of being expensive and unstable to temperature conditions normally found in the majority of drilling operations. The presently described drilling fluids need not contain such heat sensitive viscosifier materials as Xanthan gums and, therefore, can maintain their viscosity and pseudoplasticity after subjection to elevated temperatures as is normally encountered in bore holes. Synthetic organic polymers which are used as viscosifiers in drilling fluids are expensive and are only used under special application.

The present water-based, clay-free drilling fluids, having at their viscosifying agent the inhibited aluminum hydroxide described above and having a pH within the range of from at least about 8 to 10.3, have been found to be stable to temperature, the presence of calcium and sodium salts and to the presence of conventional drilling fluid additives. Further, the present drilling fluids are substantially non-corrosive and non-destructive to metal equipment commonly used in drilling operations.

This material can be used with conventional bore hole drilling equipment in manners known to those skilled in the art to efficiently and effectively drill bore holes into subterranean formations. The pseudoplastic properties of the present drilling fluids permits effective removal of the cuttings from the area at and around the drill bit to permit more efficient drilling of the formation.

Having described the basic aspects of our invention, the following examples are given to illustrate specific embodiments thereof.

EXAMPLE 1

This example shows that gluconic acid and a gluconite-tartrate combination are effective in preventing the formation of bayerite in pseudoboehmite slurries.

A series of pseudoboehmite slurries was prepared by mixing either HCl or $AlCl_3$ solutions with a sodium aluminate solution under high shear mixing to a pH of $9.0 \pm 0.25$. The concentrations were chosen to give a final AlO(OH) concentration of 3.0%. In some cases, a hydroxy acid or hydroxy acid mixture was added to one of the reactants. In other cases, no additive or a polyhydroxy alcohol was added. The reaction products were allowed to gel overnight, and were then re-sheared to liquify the gel. The pH of each product was then adjusted to 9.5 with sodium hydroxide, and allowed to stand for 10 days. After 10 days, x-ray diffraction scans were taken of each product and additional scans were taken over longer periods of time. The results, summarized in Table 1, show that the hydroxy acids were effective in inhibiting bayerite formation, whereas the polyhydroxy alcohol, glycerol, was not.

TABLE 1

| | | Effect of Hydroxy Acids | | | |
|---|---|---|---|---|---|
| Sample | Acid Phase Used | Inhibitor wt. % based on AlO(OH) | Phase to Which Inhibitor Was Added | Sample Age (Days) | Phase Present by X-Ray Diffraction |
| A | $AlCl_3$ | Gluconic Acid (1.2%) | $NaAlO_2$ | 81 | PB |
| B | $AlCl_3$ | Gluconic Acid (0.6) | $NaAlO_2$ | 81 | PB |
| C | $AlCl_3$ | Gluconic (0.3) & Tartaric (1.4) acids | $NaAlO_2$ | 96 | PB |
| D | HCl | Gluconic (0.3) & Tartaric (1.4) acids | HCl | 77 | PB |
| E | $AlCl_3$ | Gluconic (0.3) & Tartaric (1.4) acids | $AlCl_3$ | 77 | PB |
| F | HCl | Gluconic (0.3) & Tartaric (1.4) acids | $NaAlO_2$ | 111 | PB |
| G | $AlCl_3$ | Glycerol (1.7) | $NaAlO_2$ | 10 | Bayerite & PB |
| H | $AlCl_3$ | None (Control) | — | 7 | Bayerite & PB | where PB = Pseudoboehmite

EXAMPLE 2

This example shows that a tartaric acid-gluconic acid mix is effective in inhibiting the crystal growth of boehmite.

A 3% AlO(OH) dispersion was prepared as in Example 1 by reacting an $AlCl_3$ solution and a sodium aluminate solution. A tartaric-gluconic acid mix was added to the reaction mixture at the same level as in Example 1. The product was run in the roller oven at 250° F. for 16 hours under $N_2$ pressure. The crystallite size of the resultant product was determined by x-ray diffraction and compared to a similar sample made without stabilizer. The results, summarized in Table 2, show that the hydroxy acids inhibited boehmite crystallization.

TABLE 2

| | Effect of Heating | |
|---|---|---|
| Sample | Inhibiter wt. % based on AlO(OH) | Crystallite Size Out of Roller Oven of the Boehmite in Angstrom units (250° F., 16 hrs) |
| A | Tartaric (1.4%) & Gluconic (0.3) acids | 59 |
| B | None (Control) | 72 |

EXAMPLE 3

This example shows that boehmite crystallite growth is inhibited by hydroxy acids in the presence of cross-linked polyvinyl alcohol water-loss controller.

A partially cross-linked polyvinyl alcohol water-loss controller of the type disclosed in United States Patent Application Ser. No. 239,079 filed Feb. 27, 1981 was prepared from polyvinyl alcohol (Gelvatol 20-90 manufactured by Monsanto which was a weight average molecular weight of 125,000 and 87% hydrolyzed) by reacting it with formaldehyde in an acidic medium.

The experiment described in Example 2 was repeated, with this partially cross-linked polyvinyl alcohol water-loss controller added. The results set forth in Table 3 show that the hydroxy acids were effective in limiting boehmite crystal growth.

TABLE 3

| | Effect of Heat in the Presence of Water-Loss Controller | | | |
|---|---|---|---|---|
| Sample | Inhibitor wt. % based on AlO (OH) | AlO(OH) (%) | Cross-linked PVA (%) | Crystallite Size of the Boehmite in Angstrom units (after 250° F., 16 hrs) |
| A | Tartaric (1.4%) & Gluconic (0.3) acids | 2.4% | 1.6% | 36 |
| B | None | 2.4 | 1.6 | 42 |

EXAMPLE 4

This example illustrates the retarding effect of gluconic acid.

The experiments described in Examples 2 and 3 were repeated, with the exception that gluconic acid was used instead of the tartaric-gluconic mixture. The test results set forth in Table 4 show that gluconic acid retards boehmite crystallization.

TABLE 4

| | Effect on Gluconic Acid | | | |
|---|---|---|---|---|
| Sample | Gluconic Acid wt. % based on AlO(OH) | AlO(OH) (%) | Cross-linked PVA (%) | Crystallite Size of the Boehmite in Angstrom Units (after 250° F., 16 hrs) |
| A | 1.2% | 2.4% | None | 40 |
| B | 0.6 | 2.4 | None | 56 |
| C | None | 2.4 | None | 72 |
| D | 1.2 | 2.4 | 1.6 | 30 |
| E | 0.6 | 2.4 | 1.6 | 36 |
| F | None | 2.4 | 1.6 | 42 |

EXAMPLE 5

This example illustrates the inhibiting effect of hydroxy acids on partially dried AlO(OH).

An AlO(OH) dispersion was prepared as in Example 2, and the product was washed and dried to about 21-26% AlO(OH).

A similar sample was made with glycerol instead of the hydroxy acid inhibitors. Both products were examined periodically by x-ray diffraction and the results set forth in Table 5 show that bayerite and gibbsite were formed in the glycerol containing sample after 21 days, whereas the sample made with hydroxy acids showed no bayerite or gibbsite after as much as 105 days.

TABLE 5

Long Term Effect of Inhibitors on Dried AlO(OH)

| Sample | Inhibitor wt. % based on AlO(OH) | Dried Product Analysis AlO(OH) (%) | T.V. (%) | NaCl (%) | X-Ray Sample Age (Days) | | | | | |
|---|---|---|---|---|---|---|---|---|---|---|
| | | | | | (1) | (7) | (21) | (38) | (55) | (105) |
| 1 | Glycerol (1.7%) | 25.9% | 78.7% | 3.2% | (PB) | (PB) | (PB,B,G) | (PB,B,G) | (PB,B,G) | — |
| 2 | Tartaric (1.4) & Gluconic (0.3) acids | 20.9 | 81.1 | 2.1 | (PB) | (PB) | (PB) | (PB) | (PB) | (PB) |

PB = Pseudoboehmite
B = Bayerite
G = Gibbsite
T.V. = Total volatile determined by ignition at 950° C.

It is understood that the foregoing detailed description is given merely by way of illustration and that many variations may be made therein without departing from the spirit of this invention.

What is claimed is:

1. A method of retarding tri-hydrate formation and reducing boehmite crystallization when an aqueous aluminum hydroxide mixture is formed by reacting an acid reactant and a base reactant wherein at least one of the acid or base reactants contains aluminum comprising reacting said aluminum hydroxide forming acid and base reactants which further contain aluminum in the presence of a hydroxy carboxylic acid or salt of a hydroxy carboxylic acid.

2. A method according to claim 1, wherein the hydroxy acid or salt is present in an effective amount of up to about less than 5% by weight based on the weight of the aluminum present expressed as AlO(OH).

3. A method according to claim 1, wherein the hydroxy acid is gluconic acid, tartaric acid, gallic acid, citric acid or a mixture of these acids.

4. A method according to claim 1, wherein the salt of the hydroxy acid is a salt of gluconic acid, tartaric acid, gallic acid, citric acid or a mixture of these salts.

5. A method according to claim 4, wherein the salt is a sodium, potassium or ammonium salt.

6. A method according to claim 1, wherein the acid reactant is selected from the group consisting of aluminum chloride, aluminum nitrate, aluminum sulfate, hydrochloric acid, sulfuric acid, nitric acid, acetic acid and mixtures thereof.

7. A method according to claim 1, wherein the base reactant is selected from the group consisting of sodium hydroxide, ammonium hydroxide, potassium hydroxide, sodium aluminate, potassium aluminate and mixtures thereof.

8. A method according to claim 1, wherein the acid reactant is hydrochloric acid and the base reactant is sodium aluminate.

9. A method according to claim 1, wherein the acid reactant is hydrochloric acid and the base reactant is potassium aluminate.

10. A method according to claim 1, wherein the pH of the reaction mixture is from above about 7 to about 11.

11. A method according to claim 10, wherein the pH of the reaction mixture is from about 8 to about 10.

12. A method according to claim 1, wherein said hydroxy acid or salt of a hydroxy acid is added to said acid reactant.

13. A method according to claim 1, wherein said hydroxy acid or salt of a hydroxy acid is added to said base reactant.

14. An aqueous inhibited aluminum hydroxide composition obtained by reacting in the presence of a hydroxy carboxylic acid or salt of a hydroxy carboxylic acid an acid reactant and a base reactant wherein at least one of the acid or base reactants contains aluminum.

15. A composition according to claim 14, wherein the hydroxy acid or salt is present in an effective amount of up to about less than 5% by weight based on the weight of the aluminum present expressed as AlO(OH).

16. A composition according to claim 14, wherein the hydroxy acid is gluconic acid, tartaric acid, gallic acid, citric acid or a mixture of these acids.

17. A composition according to claim 14, wherein the salt of the hydroxy acid is a salt of gluconic acid, tartaric acid, gallic acid, citric acid or a mixture of these salts.

18. A composition according to claim 17, wherein the salt is a sodium, potassium or ammonium salt.

19. A composition according to claim 14, wherein the acid reactant is selected from the group consisting of aluminum chloride, aluminum nitrate, aluminum sulfate, hydrochloric acid, sulfuric acid, nitric acid, acetic acid and mixtures thereof.

20. A composition according to claim 14, wherein the base reactant is selected from the group consisting of sodium hydroxide, ammonium hydroxide, potassium hydroxide, sodium aluminate, potassium aluminate and mixtures thereof.

21. A composition according to claim 14, wherein the acid reactant is hydrochloric acid and the base reactant is sodium aluminate.

22. A composition according to claim 14, wherein the acid reactant is hydrochloric acid and the base reactant is potassium aluminate.

23. A composition according to claim 14, wherein the pH of the reaction mixture is from above about 7 to about 11.

24. A composition according to claim 23, wherein the pH of the reaction mixture is from about 8 to about 10.

25. A composition according to claim 14, wherein said hydroxy acid or salt of a hydroxy acid is added to said acid reactant.

26. A composition according to claim 14, wherein said hydroxy acid or salt of a hydroxy acid is added to said base reactant.

27. A dried, inhibited aluminum hydroxide product produced by drying the aqueous mixture of claim 14.

28. A dried, inhibited aluminum hydroxide product according to claim 27, wherein the aluminum content expressed as AlO(OH) is about at least 10% by weight.

29. In an aqueous drilling fluid for use in drilling bore holes into subterranean formations where said drilling fluid contains at least a viscosifier, the improvement wherein the viscosifier is the aqueous inhibited aluminium hydroxide composition of claim 14.

30. The drilling fluid according to claim 29, further comprising a reaction product between polyvinyl alcohol and a compound containing at least one aldehyde group therein or capable of generating in situ at least one aldehyde group.

31. In an aqueous drilling fluid for use in drilling bore holes into subterranean formations where said drilling fluid contains at least a viscosifier, the improvement wherein the viscosifier is the dried, inhibited aluminum hydroxide product of claim 28 to which water has been added.

32. The drilling fluid according to claim 31, further comprising a reaction product between polyvinyl alcohol and a compound containing at least one aldehyde group therein or capable of generating in situ at least one aldehyde group.

* * * * *